Patented Nov. 26, 1929

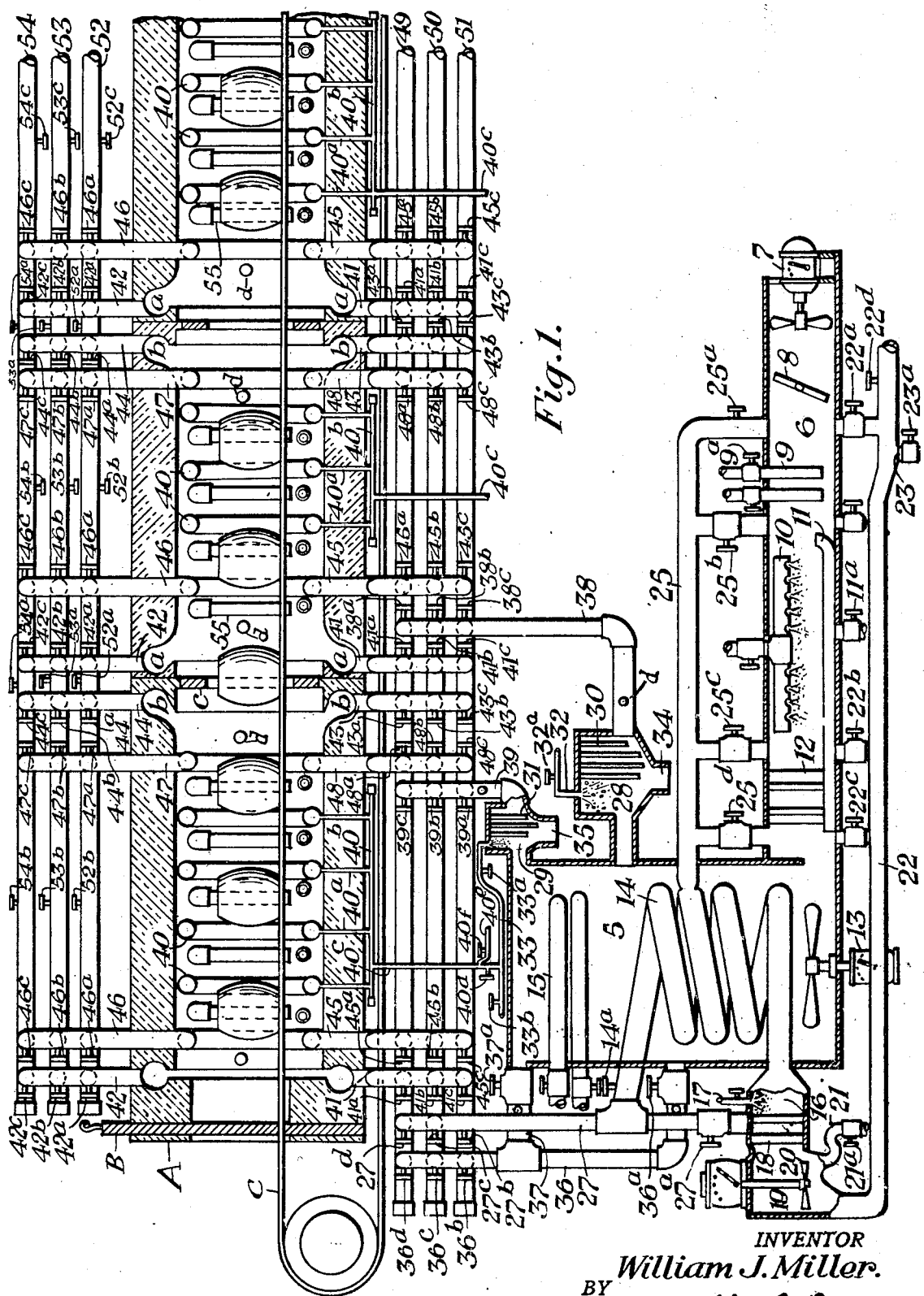

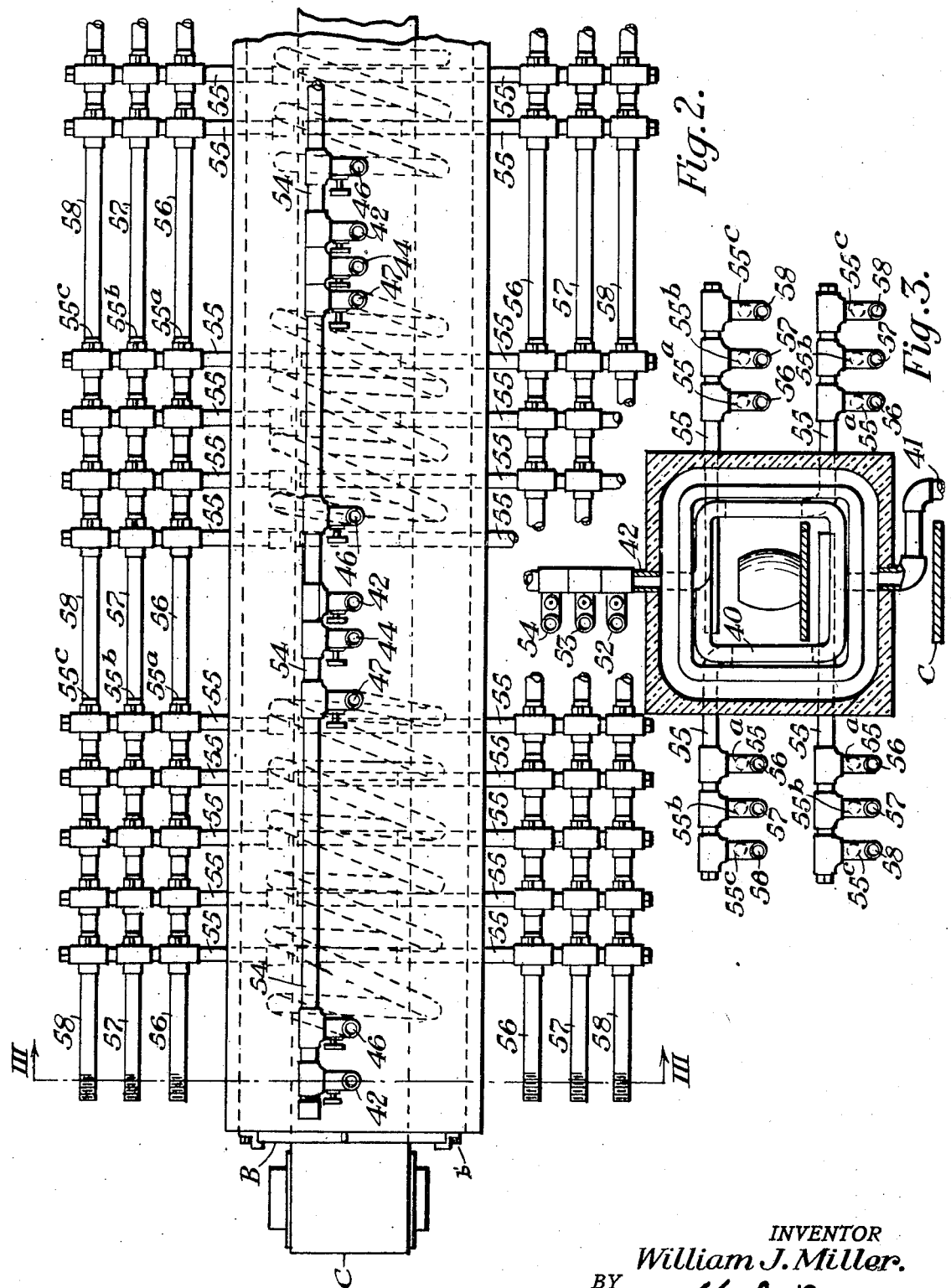

1,737,259

UNITED STATES PATENT OFFICE

WILLIAM J. MILLER, OF SWISSVALE, PENNSYLVANIA

PROCESS AND APPARATUS FOR DRYING CERAMIC WARE

Application filed August 6, 1927. Serial No. 211,142.

This invention relates to a process and apparatus for drying ceramic ware, and the primary object of the same is to more accurately control the temperature, humidity, volume, direction of flow and velocity of the air in the whole or any part of a drying room, and extract and conserve heat and moisture from the spent air that would otherwise be wasted and transfer and apply this heat and moisture in conditioning incoming air and also reconditioning spent air.

A further object of the invention is to provide for reconditioning of the air at any stage of its cycle in the drying apparatus and utilize the reconditioned air in further drying operations, and also mix reconditioned air with partly or completely spent air and apply the mixed air in further drying operations.

Another object of the invention is to provide for even or selective drying of the ware by constructing the apparatus in zones of any preferred length or size and so arranging the various instrumentalities and controls that air of varying degrees of temperature, humidity, volume and velocity may be applied to the individual zones or portion of a zone, or the spent or partly spent air may be by-passed around one or more zones to another or other zones.

A further object of the invention is to provide independent control of the air temperature at the top, bottom or either side of the zone, and raise or lower the temperature of the air after it has entered the zone by independent means independently controlled or by radiation from the spent air of another zone, and further, to provide forced circulation of air in any or all zones and the extraction of moisture and heat in the drying apparatus as well as in separate apparatus for reconditioning and recirculation of spent air.

A still further object of the invention is to generally improve and render more convenient and economical apparatus of this class, and provide for more desirable and effective control of air in the drying of ceramic ware.

Additional objects and advantages will be brought out and more fully explained in connection with the description of the apparatus and its operation, the apparatus herein shown being simply for the purpose of illustrating a preferred arrangement of instrumentalities which may be adopted in controlling the circulation, heat recovery and reconditioning of the air relatively to ware subjected to the drying operation.

In the drawings:

Figure 1 is a side elevation, partly in section and diagrammatic, of one form of apparatus which may be adopted in carrying out my improved method;

Fig. 2 is a top plan view, and

Fig. 3 is a section on the line III—III, Fig. 2.

By the term "spent air" herein referred to is meant air that lacks the proper degree of humidity and/or temperature for drying ware in a particular zone, and by the term "conditioned air" is meant air that contains the proper degree of humidity and temperature for most efficiently drying ware in a particular zone. What may be spent air in one zone may contain the proper relative humidity and temperature for the ware passing through another zone, and what may be conditioned air in one zone may lack the proper relative humidity and temperature for ware passing through another zone.

The improved structure is shown as comprising a drying tunnel or chamber and apparatus and air conditioning apparatus. The drying tunnel or chamber and apparatus is shown disposed over the air conditioning apparatus and arranged in zones, and it may be desired to have a separate air conditioning apparatus for each zone or interconnected with part of the zones. Heating or refrigerating elements individually aid in the control and regulation of the temperature in each zone or portion of a zone, and the highest temperature may be applied at either end or any part of any zone, or the air may be circulated through one zone and its temperature raised and/or lowered therein and circulated through succeeding zones until spent and then reconditioned and again circulated, or the spent and reconditioned air may be mixed and circulated, or the spent air may be applied in re-heating incoming or other spent air. The spent air may be taken from any zone or zones or portion thereof and reconditioned and again circulated through the drying section, or the air may be reconditioned at any stage of its cycle and again circulated through, or applied to, any zone or zones or portion thereof. The velocity and volume of the air may also be controlled throughout the individual zones or part thereof as well as the direction of flow in each zone. The incoming air may normally contain varying percentages of relative humidity and may ofttimes be conditioned or adapted for drying the ware in certain zones simply by the application of heat or mixing therewith hot, dry air or spent air.

The air conditioning apparatus comprises means for humidifying and dehumifying either the spent air or atmospheric air or both spent air and atmospheric air and raising and lowering the temperature of such air, and as shown comprises a main temperature-controlling chamber 5, the lower portion of this chamber leading into a chamber 6, which is here shown as horizontally disposed at right angles to the main chamber 5. The chamber 6 contains humidifying means which may act either on atmospheric air or spent air or both. A suction and circulating fan 7 as shown disposed at one extremity of the chamber 6 and controlled by a valve 8, to admit varying degrees of atmospheric air to the humidifying chamber 6. The humidifying chamber 6 contains individual or unitary heating elements or coils 9, controlled by individual valves $9^a$, which may be automatically regulated, and spraying means 10, which may be fed from a suitable source and the water heated or cooled and under automatic control. The excess spray water not absorbed by the air collects on a trough, pan or similar means 11 and is carried off by a valved drain pipe $11^a$ or may be conveyed back to the source of supply for further use. The saturated air contacts with suitably shaped baffles 12 and the excess moisture falls onto the trough 11. A fan 13 is disposed at the bottom of the main chamber 5, and above this fan a heat and moisture extracting coil 14 is shown for the introduction and circulation of spent air from the drying apparatus. Additional heating elements or coils 15 for superheating the air are disposed in the main chamber 5, and any number of these heating units may be used and manually controlled by valves or under thermostatic control, or the chamber may be heated by one unit or coil under thermostatic control, as will be understood. The one extremity of the coil 14 opens into an enlarged head or humidifying chamber 16, this latter chamber being also supplied with spraying means as at 17 and baffles 18. The chamber 16 opens into a fan chamber 19 having a fan 20 disposed therein. The fan chamber 19 is provided with a water trap 21 having a valve $21^a$, for carrying off excess moisture or water of condensation. The chamber 19 leads into or has attached thereto a pipe 22, extending across and opening along its length into the humidifying chamber 6 at three different points of inlet, said inlets being controlled by valves $22^a$, $22^b$ and $22^c$, the pipe 22 being also provided with a valve $22^d$ and trap 23 drained by a valve $23^a$. The pipe 22 may extend to the atmosphere and also other conditioning or drying apparatus or other parts of the same conditioning or drying apparatus, and by opening the valve $22^d$, part or all of the spent air from the drying apparatus may be permitted to escape or pass to other apparatus. Thus if the spent air is unsuited for reconditioning atmospheric air, it may be permitted to escape and atmospheric air admitted through the valve 8. The upper extremity of the coil 14 is shown as communicating with pipe 25, the latter opening into the humidifying chamber 6 at four different points and controlled by valves $25^a$, $25^b$, $25^c$ and $25^d$. The inlet to the coil 14 is controlled by a valve $14^a$, and spent air from the drying apparatus passes into this coil 14 through a pipe 27, this pipe being provided with a valve $27^a$ below the entrance to said coil, and other valves for controlling admittance of air from the drying apparatus, as will be more fully hereinafter described.

The main temperature-control chamber 5 is shown as opening into a plurality of auxiliary humidity-control chambers 28 and 29, these chambers being provided with suitably disposed baffles 30 and 31 and spray means or pipes 32 and 33, which may connect with a source of hot and cold water supply, said pipes 32 and 33 being provided with valves $32^a$, $33^a$ and $33^b$. The chambers 28 and 29 are also provided with drain traps and valves as at 34 and 35, and the excess moisture or water from these chambers may also be conveyed to the source of supply for further use, it being understood that wherever excess moisture or water of condensation is taken off from the apparatus, same may be conducted to the source of supply for further use, the consumption of water by the apparatus being confined to that actually absorbed by the air during the reconditioning process. These auxiliary humidity control chambers may serve to regulate the humidity of the air as it leaves the main chamber 5, or, if desired, to bring the air to varying degrees of saturation relatively to its temperature upon leaving the chamber 5 and which may be regulated and controlled by the heating elements 15. A pipe 36 leads from the main temperature-controlling chamber 5 below the heating elements 15 to the drying apparatus, this pipe connecting with a pipe 37 leading off from the top of said chamber above the heating elements 15, these pipes being provided with valves $36^a$ and $37^a$ controlling outlet from the chamber, so that air may be taken from the chamber 5 in a heated or superheated state or mixed. Pipes 38 and 39 lead from the auxiliary humidity control chambers 28 and 29 to the drying apparatus, and these pipes may be provided with suitable automatic controls, such as thermostats and hygrostats, as indicated at $d$, to automatically regulate the passage of air therethrough to the drying apparatus.

The drying tunnel or chamber and apparatus is shown constructed in zones, which may be of any desired size, closed on all sides by a frame A and having a gate B at each end, which may be adjusted and held in adjusted position as by screws $b'$, to restrict each end of the tunnel in accordance with the size of the ware passing therethrough on an endless conveyor C. Each zone is defined by annular slots or grooves $a$ and $b$, formed in the frame, and an annular flange or extension $c$ of the frame. Each zone is preferably provided with a heat and moisture-extracting and transferring coil 40, which completely encircles the zone and may be supported by, and partially embedded in, the inner wall of the frame A. Each turn of the coil 40 at its lowermost point is provided with a drain tube $40^a$ leading into a common drain pipe $40^b$, a pipe $40^c$ leading from said pipe $40^b$ to the pipe 33 for conducting water under pressure to the auxiliary humidity control chamber 29, the pipe $40^c$ being provided with a valve $40^d$. By this means the excess moisture or water of condensation from the coils 40 of the various zones is supplied to the auxiliary humidity-control chamber 29. A branch pipe $40^e$, provided with a valve $40^f$, also connects with the pipe $40^c$ and may lead to the auxiliary humidity control chamber 28 or main humidity control chamber 6 or other parts of the conditioning apparatus, to assist in conditioning the spent or atmospheric air.

Projecting into the frame A and communicating with the annular slots $a$ and $b$ and each end of the coil 40 are pipes 41, 42, 43 and 44, and 45, 46, 47 and 48. Each of these pipes extend exteriorly of the frame and branch off into lower and upper manifolds 49, 50 and 51, and 52, 53 and 54, and each branch is independently controlled by valves $41^a$, $41^b$ and $41^c$; $42^a$, $42^b$ and $42^c$; $43^a$, $43^b$ and $43^c$; $44^a$, $44^b$ and $44^c$; $45^a$, $45^b$ and $45^c$; $46^a$, $46^b$ and $46^c$; $47^a$, $47^b$ and $47^c$ and $48^a$, $48^b$ and $48^c$. These manifolds may extend parallel with the drying tunnel and be common to all the zones thereof. The coil 40 opens at one end in both the lower and upper pipes 45 and 46 and at its opposite end in the similar pipes 48 and 47, and thus it will be seen that a fluid medium or air may be circulated through this coil from the upper pipe 46 and out through the lower pipe 48, by closing off the pipes 45 and 47, or vice versa, or the air may be circulated through said coil from the lower pipe 45 to the similar pipe 48 by closing off both upper pipes 46 and 47, and vice versa. This coil 40 serves to extract heat from the spent air circulating through certain zones of the drying apparatus in a manner similar to the coil 14 in the chamber 5 of the conditioning apparatus, and this heat transferred to other zones where the air may require heat, without circulating the air through the conditioning apparatus. The pipes 38 and 39 leading from the auxiliary humidity-control chambers 28 and 29 branch off into each of the lower manifolds 51, 50 and 49, each branch being independently controlled by valves $38^a$, $38^b$ and $38^c$, and $39^a$, $39^b$ and $39^c$, and likewise the pipe 36 extending directly from the main temperature-control chamber 5 branches off into each of the said lower manifolds and each branch is independently controlled by valves $36^b$, $36^c$ and $36^d$. The pipe 27 for conveying spent or other air desired to be reconditioned from the drying apparatus to the conditioning apparatus also branches off from the lower manifolds 51, 50 and 49, each branch being independently controlled by valves $27^b$, $27^c$ and $27^d$. The lower manifolds 49 and 50 serve principally for the introduction of conditioned air, selectively admitted thereto from the pipes 36, 38 and 39, into the various zones also selectively through the pipes 41, 43, 45 and 48, and the manifold 51 for taking off spent air from the zones through the pipes 41 and 43 and/or 45 and 48 and conveying it back to the conditioning apparatus by way of the pipe 27.

The upper manifolds are provided with valves $52^a$, $52^b$, $53^a$, $53^b$ and $54^a$, $54^b$, and these manifolds serve for the selective circulation and recirculation of the air of the various zones of the complete drying tunnel or chamber.

Extending into each zone through and supported by, the frame A are a plurality of temperature-controlling elements shown in the form of pipes 55, these pipes having the ends which project into the tunnel or drying chamber closed and at their opposite ends communicating with, or branching into, a plurality of manifolds or distributing flues 56, 57 and 58, as shown in Figs. 2 and 3, for the introduction and circulation in these pipes of a heating or cooling medium such as steam, electricity, hot or cold water or the like. Each branch of the pipes is provided with shut-off means or valves $55^a$, $55^b$ and $55^c$, so that the heating and cooling mediums that may be admitted to the manifolds 56, 57 and 58 may be selectively circulated in the temperature-controlling elements or pipes 55. The elements or pipes 55 are preferably arranged so as to present a radiating surface to all sides of the drying tunnel or chamber, so that as shown in Fig. 3, the pipes of two lines of manifolds make a sharp bend inside the frame while the pipes of the remaining two lines of manifolds extend straight across the top and bottom walls of the chamber. For example, it may be desired to introduce steam into the manifolds at varying pressures and this steam selectively admitted to and circulated in the temperature-controlling elements or pipes 55, so that each zone or part thereof may have varying degrees of temperature imparted thereto, the primary object in view being selective temperature control of the zones. The ends of the manifolds 49, 50 and 51 may connect with a source or sources of supply of steam, hot water, etc., or, if electricity is used, wires may be inserted in the manifolds and serve to supply current to coils in the pipes 55.

Wherever fans are employed, it will be understood that driving means therefor or motors may be controlled by suitable rheostats or speed-regulating means, to regulate the forced circulation of air throughout the drying and conditioning apparatus as may be found desirable, and such speed-regulating means may also be under the control of thermostats located at suitable points in the circulating system. It will also be understood that the frame A may be suitably insulated and sealed to retain heat or moisture or air in the drying tunnel or chamber and the pipes and other parts likewise insulated.

In the drying of ceramic ware, it is important that the correct degree of heat and humidity be applied to each zone, and although valves are shown in the present instance to simplify the illustration, it will be understood that in practice these valves may be under thermostatic and hygrostatic control and anemometers also provided wherever such installation is practicable, and likewise, each zone may be equipped with suitable means for indicating the heat and moisture content of the air and also suitable automatic regulating instruments, such as thermostats and hygrostats, may be provided for each zone, as indicated at $d$, to automatically control the ingress and egress of air adapted for the ware passing therethrough, and these zones may be of varying sizes or one zone may blend with another as by intermingling the air applied thereto.

It is well understood by those familiar with the drying of ceramic ware that at the beginning of the drying process the air should be at a relative high humidity and temperature, so that there may be little or no evaporation until the ware is heated to the proper temperature, after which the drying action of the air must be controlled so as to prevent surface-hardening, or the outer surface of the ware must be dried at a rate which corresponds to the movement of the moisture from the interior of the ware outwardly. Thus the moisture content or relative humidity of the air should be highest at the beginning of the drying process and gradually or correspondingly lowered as the drying proceeds. As the moisture is taken from the ware, it is absorbed by the air in the drying tunnel or chamber, gradually saturating the air, and this air must therefore be reconditioned or varying degress of heat and/or moisture extracted therefrom or applied thereto during the drying process.

By the present method of zone control and construction of apparatus, air that may not be suitable for the most efficient drying of ware in a particular zone or zones may be applied to other zones along the length of the drying tunnel or chamber until unfit for further use in any part or zones of the same, and then passed back to the conditioning apparatus and reconditioned and again circulated, the excess heat and moisture being constantly extracted from the circulating air and utilized in heating and reconditioning the spent air. As the air absorbs moisture from the drying ware and as it is desirable that the moisture content and relative humidity of the air be highest at the beginning of the drying process, it is preferred to normally circulate the air through the drying tunnel in a direction counter to the direction of movement of the conveyor C on which the ware to be dried may be disposed. However, the air may be circulated in either direction throughout the drying tunnel, or in one direction in a particular zone or zones and in the opposite direction in another zone or zones, by proper manipulation of the controls.

For example, let it be assumed that the drying apparatus is divided into five zones with one air-conditioning apparatus connected therewith, and that it is desired to subject the ware entering the first zone in its wet cold state to air at a temperature of 30° C. with a relative humidity of 80%,—which may be determined by equipping each zone with suitable indicating means such as dry and wet bulb thermometers,—and to gradually raise the temperature 10° C. in each succeeding zone and lower the relative humidity 10%. The zones may be brought to the desired temperature by selectively opening the valves $55^a$, $55^b$ and $55^c$ of the temperature-controlling elements 55, and the air-conditioning apparatus placed in operation to increase the relative humidity to the desired proportions and start a forced circulation through the drying tunnel, the air being selectively admitted to the zones and also to the coils 40 therein through the pipes 38 and 39, manifolds 49 and 50 and pipes 41 and 43 by selectively opening valves $38^b$ and $38^c$, $39^b$ and $39^c$; $41^a$ and $41^b$ and $43^a$ and $43^b$. The ware may then be gradually continuously or intermittently moved through the drying tunnel or chamber on the conveyor C. The ware entering the tunnel in a relatively wet, cold condition will tend to lower the temperature and increase the relative humidity of the air, and it will therefore be necessary to establish what may be considered a balancing action in the zones, and, generally, this may be done by selectively intermingling and circulating and recirculating the air through the various zones by proper manipulation of the valves $42^a$, $42^b$ and $42^c$ and $44^a$, $44^b$ and $44^c$ and also through the coil 40 by proper manipulation of the valves $46^a$, $46^b$ and $46^c$ and $47^a$, $47^b$ and $47^c$, until the air is unfit for further use in any of the zones of the drying tunnel, when it may be taken off and passed back to the conditioning apparatus along any part of the drying tunnel through the pipes 41, 43, 45 and 48 and manifold 51 and pipe 27 by selective manipulation of the valves controlling entrance of air into said manifold 51 and return pipe 27. However, after a balanced circulation and intermingling of the air has been established through the drying tunnel and air-conditioning apparatus for the particular character of ware subjected to the drying operation, the path of the air may remain substantially constant. To illustrate, let it be assumed that the zones have been brought to the desired temperatures by the elements 55 and that the conditioning apparatus has been placed in operation. The valves $38^a$ and $38^b$ and $39^b$ and $39^c$ may be opened to admit air from the main chamber 5 of the conditioning apparatus into the manifolds 49 and 50, and thence into each zone by opening the valves $43^a$ and $43^b$. The path of the air may then be through the zone in a direction counter to the direction of movement of the ware and out through the pipe 42 by opening valve $42^a$. The air may then be passed through the coil 40 of the adjacent zone by opening the valves $52^a$ and $47^a$ and then admitted to the next zone by opening the valves $52^a$ and $44^a$, circulated in that particular zone and finally taken off through the pipe 41 by opening the valve $41^c$, then by way of the manifold 51 and into the pipe 27 by opening the valve $27^b$, into the coil 14 by opening the valve $14^a$, through the humidifying chamber 16, fan chamber 19, pipe 22, into the humidifying chamber 6 by opening either one or both valves $22^a$ and $22^b$, and thence into the main temperature-control chamber 5 to be again circulated.

However, it should be obvious that the air may be selectively circulated and intermingled throughout the drying tunnel in whole or in part and in many different ways, and no attempt is made herein to describe the various circuits that may be imparted to the air through proper manipulation of the valves. After the zones have been brought to the desired temperature by the elements or pipes 55 and circulation established through the drying tunnel and conditioning apparatus, the zones may be maintained at the desired humidity and temperature principally by intermingling and circulation and recirculation of the air in the drying tunnel or chamber and by means of the air conditioning apparatus. Warm and hot air may be taken direct from the chamber 5 of the conditioning apparatus to the drying chamber by opening the valves $36^a$ and $37^a$ and $36^c$ and $36^d$, and this air may be selectively circulated through the zones which require a hot dry air or intermingled with the air containing a high degree of humidity and thereby reduce the relative humidity of such air.

The air from any or all of the zones may be taken back to the conditioning apparatus by way of the return manifold 51 and pipe 27, or may be admitted into pipe 27 from the manifolds 49 and 50, and if desired the air may be circulated through the coils 14 in the conditioning apparatus and the heat extracted therefrom or by-passed around these coils or circulated through part of said coils. Assuming that it is desired to pass the air through the coils 14, then the valve $14^a$ will be opened and $27^a$ closed and the heat extracted from the air will radiate in the chamber 5. After the air has passed through the coils 14, it may be passed through the humidity control chamber 16, and at this point it may be desired to lower the humidity by cold spray or raise the humidity by warm spray, or the spray may not be turned on at this point, as found desirable. The air may then be passed to the far end of the chamber 6 by opening the valve $22^a$ in pipe 22, or the air may be admitted into the chamber 6 between the spray means 10 and baffles 12 by opening the valve $22^b$, or by-passed around the chamber 6 directly into the main chamber 5 by opening the valve $22^c$. If the air is admitted into the chamber 6 by valve $22^a$, it may be heated by the coils 9 and the humidity increased or decreased by the spray means 10. After passing through the spray means 10, the excess moisture will impinge on the baffles 12 and fall into and be carried off from the trough or pan 11 by the outlet $11^a$. It will be understood that the usual thermostatic and hygrostatic controls may also be installed in the conditioning apparatus for the valves wherever same may be found practicable, to automatically regulate the humidity and temperature of the air circulating therethrough.

Spent air from the drying chamber coming into the conditioning apparatus through the pipe 27 may be passed through only part of the coils 14 and then directly into the lower main humidity-control chamber 6 through the pipe 25 by opening either one or all of the valves $25^a$, $25^b$, $25^c$ or $25^d$, and be subjected to the action of the coils 9 and sprays 10 by opening the valve $25^a$, or be admitted between the coils 9 and sprays 10 by valve $25^b$, or between sprays 10 and baffles 12 by valve 25°, or by-passed around chamber 6 into main chamber 5 by valve 25ᵈ, the fan 13 establishing sufficient circulation when it is deisred to divert the normal path of the air in the foregoing manner.

The fans 13 and 20 serve to maintain circulation of the air through the conditioning and drying apparatus, while the valve 8 and fan 7 control the admission of atmospheric air to the conditioning apparatus.

It will be seen that by circulating the air through the drying tunnel in a direction counter to the movement of the ware, hot dry air may be first applied to the ware which may have by this time passed through the greater part of the drying process and which requires air of a low percentage of relative humidity and a high degree of temperature, and as this air circulates towards the entrance to the drying tunnel and gradually absorbs moisture given off by the drying ware, it has a tendency to automatically adapt itself to the ware as it progresses through the tunnel, and by proper intermingling and recirculation of the air and use of the elements 55, a balancing action may be set up, as heretofore indicated, the spent air being taken off from the drying apparatus and replaced by conditioned air at any point along the length of the same and the spent air reconditioned and again circulated, heat and moisture being constantly extracted from the circulating air and conserved and utilized in reconditioning the spent air.

What is claimed as new is:

1. Drying apparatus comprising a drying chamber arranged in zones, means for establishing a forced circulation of air through the drying chamber, means for independently controlling the humidity, temperature and velocity of the air in each zone, means for interchangeably intermingling the air of any two or more zones, and means for extracting heat and moisture from the circulating air.

2. Drying apparatus comprising a drying chamber arranged in zones, independently controlled temperature-controlling elements for each zone, air-conditioning means comprising humidity-control chambers and heat-extracting means, means for establishing a forced circulation of air through the zones of the drying chamber and through the air-conditioning means, means for selectively intermingling the air of the zones and circulating said air through the drying chamber until spent, and means for withdrawing and reconditioning the air along any point of its circulatory path through the drying chamber.

3. Apparatus for drying ceramic ware comprising temperature-controlling and air-circulating means arranged in zones in one continuous drying passage and independently controlled in each zone, means for conveying the ware through said passage, air-conditioning apparatus comprising heat-extracting coils and humidifying and dehumidifying chambers, means for establishing a forced circulation of air through the drying chamber and circulating means and air-conditioning apparatus, the air-circulating means being so connected and controlled as to permit selective intermingling of the air of different zones and withdrawal of spent air from, and introduction of reconditioned air into, any selected zone, and means for conducting the spent air to the air-conditioning apparatus.

4. Apparatus for drying ceramic ware comprising a drying chamber arranged in consecutive zones, means for conveying the ware through said chamber, a main temperature-control chamber and a plurality of humidity-control chambers, heat and moisture extracting means in each zone and temperature-control chamber, means for causing a forced circulation of air, control means for withdrawing air from any selected zone or zones and directing its path of circulation through any selected chamber until spent, and means for conducting the extracted moisture and heat and spent air to the temperature and humidity control chambers, the heat and moisture extracted from the circulating air being applied in reconditioning spent air.

5. In apparatus for drying ceramic ware, a drying chamber arranged in zones, independently controlled temperature-controlling elements projecting into each zone and connecting with a plurality of manifolds, air-conditioning means comprising a main temperature-control chamber and a plurality of humidity-control chambers, heat and moisture extracting coils in each zone and temperature-controlling chamber and interposed in the circulatory path of the air, means for causing a forced circulation of the air, and control means for selectively directing the path of the air.

6. In apparatus for drying ceramic ware, a drying chamber arranged in zones, independently-controlled temperature-controlling elements extending into each zone and having a plurality of manifolds, a plurality of air circulating flues, air conditioning means comprising a main temperature-control chamber and a plurality of humidity-control chambers, heat extracting coils in the zones of the drying chamber and main temperature-control chamber and interposed in the circulatory path of the air, means for establishing a forced circulation of air through the circulating flues, drying chamber and air conditioning apparatus, and means in said flues for intermingling spent and conditioned air in any selected zone and withdrawing spent air at any point in the circulatory path of the air through the drying chamber.

7. In apparatus for drying ceramic ware, a drying chamber and temperature and humidity control chambers, circulating flues and independently-controlled temperature-controlling elements arranged in zones in the drying chamber, a plurality of manifolds for the temperature-controlling elements, heat and moisture extracting coils in the zones of the drying chamber and temperature-control chamber and interposed in the circulatory path of the air, means for establishing a forced circulation of air through the circulating flues, drying chamber and temperature and humidity control chambers, and controlling means for intermingling the air of any selected zone or zones and withdrawing air from any selected zone or zones and reconditioning the air by recirculation through the temperature and humidity control chambers.

8. In the art of drying ceramic ware, the process which consists in conveying the ware to be dried through a drying tunnel arranged in zones, causing a forced circulation of air through the tunnel in a direction counter to the movement of the ware, and selectively intermingling and recirculating the air in the zones until spent.

9. In the art of drying ceramic ware, the process which consists in conveying the ware to be dried through a drying tunnel arranged in zones, causing a forced circulation of air through the tunnel and through air conditioning chambers and extracting heat and moisture of condensation from the air during circulation, and maintaining the required relative temperature and humidity of the air in the drying tunnel as a whole by selective zone intermingling and recirculation until spent and conditioning the spent air and incoming atmospheric air by the heat and moisture extracted from the circulating air.

10. In the art of drying ceramic ware, the process which consists in conveying the ware to be dried through a drying tunnel arranged in zones, causing a forced circulation of air through the tunnel in a direction counter to the direction of conveyance of the ware, disposing a series of coils in the path of the circulating air to extract excess heat and moisture therefrom, maintaining the required relative humidity of the air in the tunnel as a whole by absorption of moisture given off by the drying ware and the temperature by intermingling and recirculating the air of any selected zone or zones until spent, utilizing the extracted heat and moisture to assist in reconditioning the spent air, and recirculating the spent air reconditioned.

11. In the art of drying ceramic ware, the process which consists in conveying the ware to be dried through a drying tunnel arranged in zones, causing a forced circulation of conditioned air through the tunnel in a direction counter to the direction of conveyance of the drying ware to assist in maintaining the proper relative humidity and temperature of the circulating air, and maintaining the proper degree of temperature and percentage of relative humidity of the air in the tunnel as a whole by extracting excess moisture and heat and selectively intermingling and recirculating the air of the various zones until spent and passing the spent air through conditioning apparatus, the excess moisture and heat being conducted to said apparatus to assist in reconditioning the spent air.

12. In the art of drying ceramic ware, the process which consists in conveying the ware to be dried through a drying chamber arranged in zones, preliminarily establishing a relatively low degree of temperature and high percentage of relative humidity of the air at the entrance extremity of the chamber and gradually raising the temperature and lowering the relative humidity of the air along the length of the chamber to a maximum temperature and minimum relative humidity at the exit extremity of said chamber causing a forced circulation of air through the chamber from the exit toward the entrance and in a direction counter to the progressive movement of the ware through the chamber, to assist in maintaining the initially established temperature and relative humidity of the air, further assisting in maintaining the initially established temperature and relative humidity by selective intermingling and recirculation of the air of the various zones of the chamber until spent, and extracting heat and moisture from the circulating air to be utilized in reconditioning spent air and also incoming atmospheric air.

13. In the art of drying ceramic ware, the process which consists in conveying the ware to be dried through a drying chamber arranged in zones, initially establishing a predetermined minimum degree of temperature and maximum percentage of relative humidity of the air at the entrance extremity of the chamber and gradually raising the temperature and lowering the relative humidity of the air along the length of the chamber to a maximum temperature and minimum relative humidity at the exit extremity of said chamber, causing the air to circulate and recirculate and intermingle in the zones of the drying chamber until spent, the circulatory movement of the air in general being in a direction counter to the direction of conveyance of the ware through the drying chamber and the heat and moisture given off by the drying ware and absorbed by the circulating air being constantly extracted therefrom and transferred to the spent air and incoming atmospheric air, and selectively withdrawing spent air from the zones of the drying chamber and reconditioning and intermingling the spent air with atmospheric air, the heat extracted from the spent air being also utilized in conditioning incoming atmospheric air.

14. In the art of drying ceramic ware, the process which consists in conveying the ware to be dried through a drying chamber arranged in zones, initially establishing a predetermined minimum degree of temperature and maximum percentage of relative humidity of the air at the entrance extremity of the chamber and gradually raising the temperature and lowering the relative humidity of the air along the length of the chamber to a maximum temperature and minimum relative himidity at the exit extremity of said chamber, causing the air to circulate and recirculate and intermingle in the zones of the drying chamber until spent and selectively withdrawing the spent air and circulating same through conditioning apparatus, interposing heat and moisture extracting coils in the circulatory path of the air and transferring the extracted heat and moisture to spent air and atmospheric air, the circulatory movement of the air through the drying chamber in general being from the exit toward the entrance extremity of the chamber but subject to reversal in any zone or zones of the said chamber, the movement of the air through the conditioning apparatus and drying chamber being subject to control along any portion of its circulatory path.

15. Apparatus for drying ceramic ware comprising a drying chamber arranged in zones, means for establishing a flow of air through said chamber, means to bypass said flow of air around any particular zone or zones, and means for reversing the direction of flow of the air in any particular zone or zones.

Signed by me this 4th day of August, 1927.

WILLIAM J. MILLER.